US012278689B2

(12) United States Patent
Xu

(10) Patent No.: US 12,278,689 B2
(45) Date of Patent: Apr. 15, 2025

(54) METHOD AND APPARATUS FOR GROUP EPHEMERIS DATA PROVISION

(71) Applicant: Lenovo (Beijing) Ltd., Beijing (CN)

(72) Inventor: Min Xu, Haidian District (CN)

(73) Assignee: Lenovo (Beijing) Ltd., Beijing (CN)

( * ) Notice: Subject to any disclaimer, the term of this patent is extended or adjusted under 35 U.S.C. 154(b) by 332 days.

(21) Appl. No.: 18/001,339

(22) PCT Filed: Jun. 12, 2020

(86) PCT No.: PCT/CN2020/095835
§ 371 (c)(1),
(2) Date: Dec. 9, 2022

(87) PCT Pub. No.: WO2021/248461
PCT Pub. Date: Dec. 16, 2021

(65) Prior Publication Data
US 2023/0239043 A1    Jul. 27, 2023

(51) Int. Cl.
*H04B 7/185*    (2006.01)

(52) U.S. Cl.
CPC ..... *H04B 7/18573* (2013.01); *H04B 7/18521* (2013.01); *H04B 7/18547* (2013.01)

(58) Field of Classification Search
CPC ............ H04B 7/18573; H04B 7/18521; H04B 7/18547; H04B 7/185
USPC ....................................................... 455/427
See application file for complete search history.

(56) References Cited

U.S. PATENT DOCUMENTS

| 6,157,621 A * | 12/2000 | Brown ................. H01Q 25/008 370/310 |
| 8,031,113 B2 * | 10/2011 | Gaal .................... G01S 19/258 342/357.64 |
| 8,600,297 B2 * | 12/2013 | Ketchum .......... H04W 56/0035 455/12.1 |

(Continued)

FOREIGN PATENT DOCUMENTS

| CN | 111182658 A | 5/2020 |
| EP | 3907905 B1 * | 12/2023 ............. G01S 19/00 |

(Continued)

OTHER PUBLICATIONS

"Solutions for NR to support non-terrestrial networks (NTN)", 3GPP TR 38.821 V1.0.0, 3rd Generation Partnership Project [retrieved Nov. 2, 2022]. Retrieved from the Internet <https://portal.3gpp.org/desktopmodules/Specifications/SpecificationDetails.aspx?specificationId=3525>., Dec. 2019, 143 Pages.

(Continued)

*Primary Examiner* — Mahendra R Patel
(74) *Attorney, Agent, or Firm* — FIG. 1 Patents

(57) ABSTRACT

The present application relates to a method and an apparatus for a group ephemeris data provision. One embodiment of the subject application provides a method performed by a User Equipment (UE), which includes: receiving a signal indicating a first satellite group ID of a first satellite group; and comparing the first satellite group ID with a second satellite group ID of a second satellite group in a second satellite group ID set which is previously stored in the UE, wherein the first satellite group ID is associated with group ephemeris data and each satellite group ID of the second satellite group ID is associated with group ephemeris data.

20 Claims, 5 Drawing Sheets

(56) References Cited

U.S. PATENT DOCUMENTS

| | | | |
|---|---|---|---|
| 9,322,922 B2* | 4/2016 | Pratt | G01S 19/43 |
| 11,985,618 B2* | 5/2024 | Narasimha | H04B 7/18506 |
| 2002/0142781 A1* | 10/2002 | Wiedeman | H04B 7/18547 |
| | | | 455/456.5 |
| 2002/0190898 A1* | 12/2002 | Abraham | G01S 19/05 |
| | | | 342/357.43 |
| 2007/0155401 A1* | 7/2007 | Ward | H04W 64/00 |
| | | | 455/456.1 |
| 2009/0313370 A1* | 12/2009 | Rhoads | G01S 5/18 |
| | | | 709/224 |
| 2011/0256865 A1* | 10/2011 | Sayeed | H04B 7/18589 |
| | | | 455/427 |
| 2016/0278033 A1* | 9/2016 | Wu | H04W 56/0045 |
| 2018/0011162 A1* | 1/2018 | Bovard | G01S 11/02 |
| 2018/0175932 A1* | 6/2018 | Lucky | H04B 7/2041 |
| 2020/0153500 A1* | 5/2020 | Kim | H04B 17/318 |
| 2020/0379118 A1* | 12/2020 | Reid | G01S 19/10 |

FOREIGN PATENT DOCUMENTS

| | | | | |
|---|---|---|---|---|
| WO | WO-9309613 A1 * | 5/1993 | | H01Q 1/242 |
| WO | WO-0206987 A1 * | 1/2002 | | G01S 19/06 |
| WO | WO-2014108212 A1 * | 7/2014 | | G01S 19/20 |
| WO | WO-2017019246 A1 * | 2/2017 | | H04B 7/02 |
| WO | WO-2019080056 A1 * | 5/2019 | | H04W 24/00 |
| WO | WO-2020098627 A1 * | 5/2020 | | H04B 7/1851 |

OTHER PUBLICATIONS

Mediatek Inc , "Grouping and Automatic Reconfiguration for Handover Enhancement in Leo Ntn", 3GPP Tsg- Ran WG2 Meeting #106, R2-1905702, Xi'an, China [retrieved Nov. 2, 2022]. Retrieved from the Internet <https://www.3gpp.org/ftp/tsg_ran/WG2_RL2/TSGR2_106/Docs>., May 2019, 7 Pages.

PCT/CN2020/095835 , "International Preliminary Report on Patentability", PCT Application No. PCT/CN2020/095835, Dec. 22, 2022, 5 pages.

PCT/CN2020/095835 , "International Search Report and Written Opinion", PCT Application No. PCT/CN2020/095835, Mar. 10, 2021, 6 pages.

Thales , "Solutions for NR to support non-terrestrial networks (NTN)", 3GPP TSG RAN meeting #86, RP-193234, Sitges, Spain [retrieved Nov. 2, 2022]. Retrieved from the Internet <https://www.3gpp.org/ftp/tsg_ran/TSG_RAN/TSGR_86/Docs>., Dec. 2019, 10 Pages.

* cited by examiner ns to wireless communication
METHOD AND APPARATUS FOR GROUP EPHEMERIS DATA PROVISION

TECHNICAL FIELD

The subject application relates to wireless communication technology, especially to a method and an apparatus for a group ephemeris data provision.

BACKGROUND OF THE INVENTION

In satellite-based mobile networks, a User Equipment (UE) may utilize ephemeris data of the satellites for cell searching, measurement and reporting, conditional handover and selection/reselection. However, the size of the ephemeris data from the satellites might be too great for the UE to handle.

Therefore, it is desirable to provide a solution to reduce the size of the ephemeris data.

SUMMARY

One embodiment of the subject application provides a method performed by a User Equipment (UE), which includes: receiving a signal indicating a first satellite group ID of a first satellite group; and comparing the first satellite group ID with a second satellite group ID of a second satellite group in a second satellite group ID set which is previously stored in the UE, wherein the first satellite group ID is associated with group ephemeris data and each satellite group ID of the second satellite group ID is associated with group ephemeris data.

Another embodiment of the subject application provides a method performed by a Base Station (BS) includes: transmitting a signal indicating a first satellite group ID of a first satellite group, wherein the first satellite group ID is associated with group ephemeris data.

Yet another embodiment of the subject application provides an apparatus, comprising: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the method performed by a User Equipment (UE), which includes: receiving a signal indicating a first satellite group ID of a first satellite group; and comparing the first satellite group ID with a second satellite group ID of a second satellite group in a second satellite group ID set which is previously stored in the UE, wherein the first satellite group ID is associated with group ephemeris data and each satellite group ID of the second satellite group ID is associated with group ephemeris data.

Still another embodiment of the subject application provides an apparatus, comprising: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the method performed by a Base Station (BS), which includes: transmitting a signal indicating a first satellite group ID of a first satellite group, wherein the first satellite group ID is associated with group ephemeris data.

DETAILED DESCRIPTION

The detailed description of the appended drawings is intended as a description of the currently preferred embodiments of the present invention, and is not intended to represent the only form in which the present invention may be practiced. It should be understood that the same or equivalent functions may be accomplished by different embodiments that are intended to be encompassed within the spirit and scope of the present invention.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. It is contemplated that along with developments of network architectures and new service scenarios, all embodiments in the present application are also applicable to similar technical problems; and moreover, the terminologies recited in the present application may change, which should not affect the principle of the present application.

In satellite-based mobile networks, the networks may have the Low Earth Orbit (LEO) satellites, which move very fast, for example, the LEO satellites have a max speed of 7.56 km/s. The ephemeris data is used to indicate the trajectories and position coordinates of the satellites. The UE can obtain the trajectories and position coordinates of its serving satellite and upcoming satellites from the network, and may conduct preliminary, location-based access and mobility management, which includes cell searching, measurement and reporting, conditional handover and selection/reselection.

The work item phase of New Radio (NR) Non Terrestrial Network (NTN) in 3GPP Rel-17 includes the following objectives:

The following control plane procedures enhancements should be specified
1. Idle mode:
   i) Definition of additional assistance information for cell selection/reselection, e.g., using UE location information, satellite ephemeris information
   ii) Definition of NTN, satellite or High-Altitude Platform Station (HAPS), cell specific information in SIB
2. Connected mode
   i) Enhancement necessary to take into account location information (UE & Satellite/HAPS) and/or ephemeris in determining when to perform hand-over, in order to have a high degree of hand-over control for hand-over robustness and coverage management.

There are several options for providing the ephemeris data to the UE. One typical option as recommended in 3GPP TR38.821 is to indicate both the orbital plane parameters and satellite level parameters to the UE.

Figure 1:
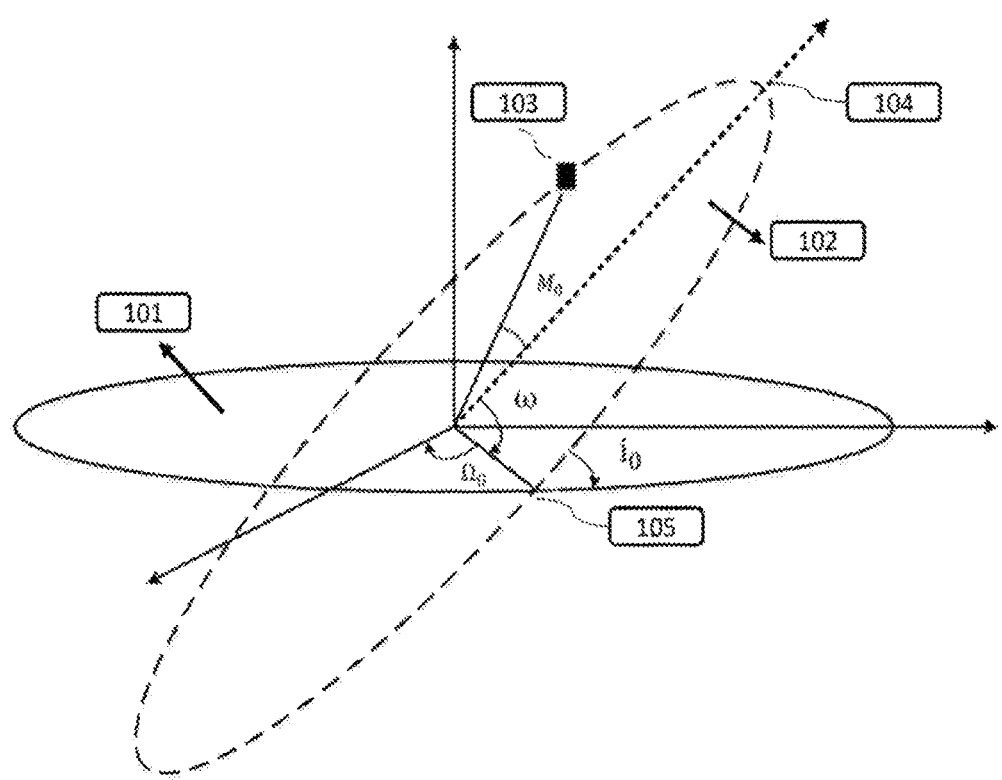
FIG. 1 illustrates a schematic diagram of essential elements of ephemeris data according to some embodiments of the subject disclosure.

For example, FIG. 1 depicts a schematic diagram of essential elements of the ephemeris data according to some embodiments of the subject disclosure. The reference numeral 101 refers to the equator plane, the reference numeral 102 refers to the orbital plane of the satellite 103, the reference numeral 104 refers to perigee, and reference numeral 105 refers to the ascending node. The orbital plane parameters of the orbital plane 102 of the satellite 103 includes: semi-major axis: a, eccentricity: e, inclination: $i_0$, right ascension of the ascending node 105: $\Omega_0$, argument of perigee: 104, $\omega$, mean anomaly at a reference point in time: $M_0$, and the epoch: $t_{0e}$.

Table 1, which is also recited in in 3GPP TR38.821, including the orbital parameters and the corresponding illustrations is presented below.

TABLE 1

Essential Elements of Ephemeris data

| Orbital plane parameters | $\sqrt{a}$ | Square root of semi major axis (semi-major axis) |
| --- | --- | --- |
| | e | Eccentricity (eccentricity) |
| | $i_0$ | Inclination angle at reference time (inclination) |
| | $\Omega_0$ | Longitude of ascending node of orbit plane (right ascension of the ascending node) |
| | $\omega$ | Argument of perigee (argument of periapsis) |
| Satellite level parameters | $M_0$ | Mean anomaly at reference time (true anomaly and a reference point in time) |
| | $t_{0e}$ | Ephemeris reference time (the epoch) |

The first five orbital plane parameters can determine the orbital plane 102 of the satellite 103, and the other two satellite level parameters are used to determine the exact location of the satellite 103 at a time.

In view of the above, indicating the orbital plane parameters requires 5 double-precision floating point numbers, which needs 5×8 Byte=40 Byte, and indicating the satellite level parameters requires 2 double-precision floating point numbers, which needs 2×8 Bytes=16 Bytes. Therefore, the minimum ephemeris data of a single satellite needs at least seven double-precision floating point numbers plus some overhead, which is more than 7×8 Bytes=56 Bytes. Furthermore, the ephemeris data needs to be broadcasted to the UE or indicated to the UE via Radio Resource Control (RRC) signalling, thus the size of the ephemeris data in this approach might be huge.

Another possible approach is to provide the location of the satellite in 3D coordinates, which is represented with (x, y, z). For the LEO satellites, a velocity vector ($v_x$, $v_y$, $v_z$) and a reference point in time are also needed. Therefore, the number of the total parameters required in this approach is 7.

As explained above, the LEO satellites move very fast, thus the position (x, y, z) may be outdated in a short period of time. Furthermore, the satellite moves in an elliptical orbit, providing a velocity vector ($v_x$, $v_y$, $v_z$) that does not help much. As a result, the satellite might need to provide, for example, broadcast, an updated location quite often, about every few minutes.

As can be seen, indicating the ephemeris data with the 3D coordinates and the velocity vectors of the satellite also requires a large amount of data.

In addition, it is necessary to provide the ephemeris data of the neighbouring or upcoming satellites to help mobility management, e.g., conditional handover or cell reselection. The scale of the ephemeris data can be quite substantial for networks with many satellites, and the overhead to broadcast, signal, store, and the UE power consumption to receive and decode will be unacceptable. In other words, the ephemeris data provision or update for the UE may lead to unacceptable broadcast, signalling, and storage overhead, as well as unacceptable UE power consumption.

According to the disclosed information, for example, the information in 3GPP TR38.821 and technical documents during the NTN study item phase, two solutions are mainly discussed for the ephemeris data provision:

The first solution is to provision the orbital plane parameters in the uSIM (Universal Subscriber Identity Module) or UE. Pre-provision satellite level parameters for all the satellites that may serve the UE in the uSIM or UE and the ephemeris data for each satellite can be linked to a satellite ID or index. Broadcast the satellite ID or index of the serving satellite in system information, for example, the SIB message, so that UE is able to find the corresponding detailed ephemeris data stored in the uSIM to derive the position coordinates of the serving satellite.

The second solution is to provision the orbital plane parameters in the uSIM or UE. Broadcast satellite level parameters of the serving satellite in the system information and UE will derive the position coordinates of the serving satellite. The ephemeris data of the neighbouring satellites can also be provided to UE via the system information or dedicated RRC signalling.

Typically, there is 128 kBytes shared for multi-purpose storage in a uSIM. Since there might be hundreds or thousands of satellites in an operator's satellite mobile network, the ephemeris data will easily exceed the capacity of a uSIM in the above two solutions. For the first solution, the size of satellite IDs or indexes will increase as well with the increasing number of satellites. For the second solution, the overhead of broadcasting or indicating full satellite level parameters of each satellite will also increase with the increasing number of satellites, and it also increases the power consumption of UE to receive and decode.

Based on the analysis for the above-mentioned solutions, broadcast or RRC signalling ephemeris data of the serving and neighbouring satellites can be seen as a baseline, but the size of the ephemeris data and the power consumption of the UE need to be reduced.

The subject disclosure proposes solutions to reduce the size of the ephemeris data and the power consumption of the UE.

Typically, all or a part of the satellites that belong to the same operator, circle in the same orbit with fixed and organized intervals, for instance, Starlink, therefore, it is sufficient to indicate the ephemeris data of one satellite and the relationship with other satellites, rather than to indicate ephemeris data for all satellites. In addition, for access and mobility management, the UE only needs to know or to predict when the next satellite or satellite cell will be available. It is unnecessary to receive and decode all ephemeris data every time the UE accesses a satellite. From this perspective, it is unnecessary to provide the orbital plane parameters.

Figure 2:
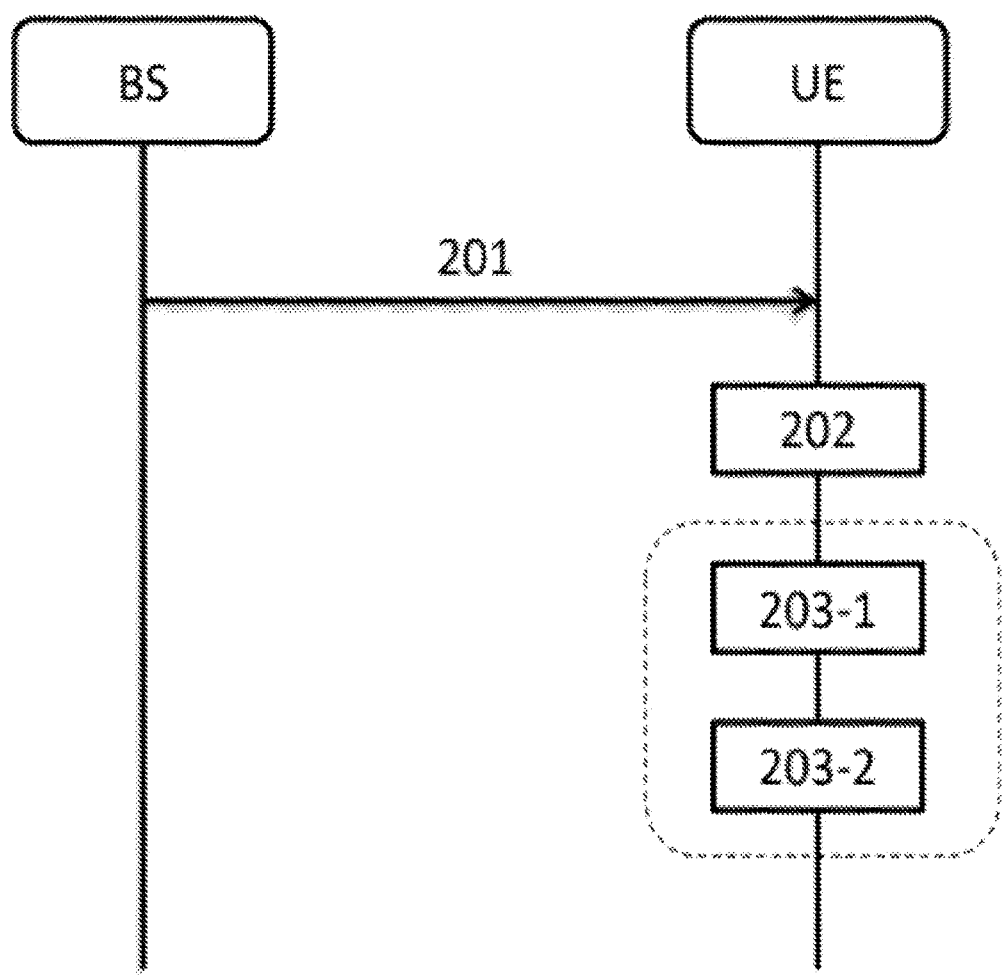
FIG. 2 illustrates a method for the group ephemeris data provision according to some embodiments of the subject application.

FIG. 2 illustrates a method for the group ephemeris data provision according to some embodiments of the subject application. FIG. 2 includes two components. One is the BS, in certain embodiments, the BS may be referred to as an access point, an access terminal, a base, a macro cell, a Node-B, an enhanced Node B (eNB), a gNB, a Home Node-B, a relay node, or any device described using other terminology used in the art. The BS is generally part of a radio access network that may include one or more controllers communicably coupled to one or more corresponding BSs.

The BS may also be a satellite belonging to the satellite group identified by the satellite group ID; a neighbouring satellite to the satellite group identified by the satellite group ID; a terrestrial gNB deployed at the edge of coverage of a terrestrial mobile network; or a neighbouring gNB to the satellite group identified by the satellite group ID.

The other one is the UE, which is in the coverage of the BS, and might use the trajectories and position coordinates of its serving and upcoming satellites if provided by the network and may conduct preliminary, location-based access and mobility management including cell searching, measurement and report, conditional handover and selection/reselection.

The UE may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present disclosure, the UE may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UE may include wearable devices, such as smart watches, fitness bands, optical head-mounted displays, or the like. Moreover, the UE may be referred to as a subscriber unit, a mobile phone, a mobile station, a user, a terminal, a mobile terminal, a wireless terminal, a fixed terminal, a subscriber station, a user terminal, or any device described using other terminology used in the art. The UE may communicate directly with the BS via uplink (UL) communication signals.

In step 201, the BS transmits a signal which indicates one or more satellite group IDs to the UE, wherein each satellite group ID is associated with the corresponding group ephemeris data. The satellite group ID is used to represent a group of satellites. The signal might be included a system information block (SIB) message, which is broadcasted periodically, or is broadcasted based on demand, for instance, based on received request(s); alternatively, the signal might be transmitted to a specific UE via dedicated Radio Resource Control (RRC) signalling.

A satellite group includes multiple satellites grouped by the network. The network might be China Mobile, China Unicom, etc. The satellites are grouped based on the orbits of the satellites or based on the intervals of the arrival times of the satellites. In other words, the satellites in the same group may have the same orbit, for example, the orbit 102 in FIG. 1, or, the intervals of the arrival times of the satellites in the same group might be an arithmetic sequence.

The subject disclosure uses a satellite group ID to refer to the ID or the index of the satellite group. The satellite group IDs might be configured with a timer, for example, an expiration timer or an update timer, wherein the timer might be set by the network, or by the UE. The timer might be reset by the network if it expires or the group ephemeris data updates.

When the group ephemeris data updates, for example, if there were a malfunction in one of the satellites in the satellite group, then the group ephemeris needs to be updated. Correspondingly, the satellite group IDs may be updated by the network.

The group ephemeris data corresponding to a satellite group ID could include at least one of following parameters:
i) the satellite level parameters of all satellites in the group;
ii) the satellite level parameters of one satellite in the group, and the difference values of the satellite level parameters of other neighbouring satellites in the same group compared to said satellite;
iii) the arrival times of all satellites in the group; and
iv) a group reference time and the intervals of arrival times of all satellites in the group compared to the group reference time.

As explained above, the satellite level parameters include: mean anomaly at a reference time, and an ephemeris reference time, which are represented with the symbols $M_0$ and $t_{0e}$ respectively. In one embodiment, the group ephemeris data includes the satellite level parameters of all satellites in the group. Supposing the satellite group has N satellites, N is an integral number and is equal to or more than one. The mean anomaly at reference time and the ephemeris reference time of the $1^{st}$ satellite in a group are represented with the symbols: $M_{0\_1}$ and $t_{0e\_1}$, the mean anomaly at reference time and the ephemeris reference time of the $2^{nd}$ satellite in the group are represented with the symbols: $M_{0\_2}$ and $t_{0e\_2}$, . . . and the mean anomaly at reference time and the ephemeris reference time of the $N^{th}$ satellite in the group are represented with the symbols: $M_{0\_N}$ and $t_{0e\_N}$, then the satellite level parameters of all the satellites, which include the mean anomaly at reference times and the ephemeris reference times of all the satellites in the group, are: $M_{0\_1}$, $t_{0e\_1}$, $M_{0\_2}$, $t_{0e\_2}$, . . . $M_{0\_N}$, and $t_{0e\_N}$. In one embodiment, the ephemeris reference time might be the same in the group, that is, $t_{0e\_1}=t_{0e\_2}=\ldots=t_{0e\_N}$. Under this condition, the ephemeris reference time might be only indicated once in the group. Assuming it is represented with $t_{0e}$, then the satellite level parameters of all satellites are: $M_{0\_1}$, $t_{0e}$, $M_{0\_2}$, . . . , and $M_{0\_N}$. It should be noted that the sequence for these parameters is not fixed, for example, it might be arranged as: $t_{0e}$, $M_{0\_1}$, $M_{0\_2}$, . . . , and $M_{0\_N}$. Other arrangements for the sequence of these parameters also apply in this solution.

In another embodiment, the group ephemeris data includes the satellite level parameters of one satellite in the group, and the difference values of the satellite level parameters of other neighbouring satellites in the same group compared to this satellite. Assuming the satellite group has N satellites, N is an integral number equal to or more than one. The mean anomaly at reference time and the ephemeris reference time of the $1^{st}$ satellite in the group are represented with the symbols: $M_{0\_1}$ and $t_{0e\_1}$, and the difference values of the mean anomaly at reference time and the ephemeris reference time of the $2^{nd}$ satellite in the group compared to those parameters of the $1^{st}$ satellite are represented with the symbols: $\Delta M_{0\_1\_2}$ and $\Delta t_{0e\_1\_2}$ respectively. The two parameters are calculated with the following two equations: $\Delta M_{0\_1\_2}=M_{0\_2}-M_{0\_1}$, and $\Delta t_{0e\_1\_2}=t_{0e\_2}-t_{0e\_1}$. Similarly, the difference values of the mean anomaly at reference time and the ephemeris reference time of the $N^{th}$ satellite in the group compared to those parameters the $1^{st}$ satellite are represented with the symbols: $\Delta M_{0\_1\_N}$ and $\Delta t_{0e\_1\_N}$ respectively. The two parameters are calculated with the following two equations: $\Delta M_{0\_1\_N}=M_{0\_N}-M_{0\_1}$, and $\Delta t_{0e\_1\_N}=t_{0e\_N}-t_{0e\_1}$. The above calculation continues until the last satellite in the satellite group. Therefore, the group ephemeris data includes: $M_{0\_1}$, $t_{0e\_1}$, $\Delta M_{0\_1\_2}$, $\Delta t_{0e\_1\_2}$, $\Delta M_{0\_1\_N}$, and $\Delta t_{0e\_1\_N}$.

It should be noted that the $1^{st}$ satellite is merely used solely to distinguish one entity or action from another entity or action without necessarily requiring or implying any actual such relationship or order between such entities or actions. That is, if the satellite level parameters of the $3^{rd}$ satellite in the group, $M_{0\_3}$ and $t_{0e\_3}$, are used as the reference parameters, then the group ephemeris data includes: $M_{0\_3}$, $t_{0e\_3}$, $\Delta M_{0\_3\_1}$, $\Delta t_{0e\_3}$, $\Delta M_{0\_3\_2}$, $\Delta t_{0e\_3\_2}$, ... $\Delta M_{0\_3\_N}$, and $\Delta t_{0e\_3\_N}$.

In one case, the ephemeris reference time could be the same in the group, that is, $t_{0e\_1}=t_{0e\_2}=t_{0e\_3}=\ldots=\Delta t_{0e\_3\_N}$. Therefore, the difference values of the ephemeris reference time are all zero. Under this condition, the ephemeris reference time might be only indicated once in the group. Assuming it is represented with $t_{0e}$, then the satellite level parameters of all satellites might be: $M_{0\_1}$, $t_{0e}$, $\Delta M_{0\_1\_2}$, $\Delta M_{0\_1\_3}$, ..., and $\Delta M_{0\_3\_N}$.

In still another embodiment, the group ephemeris data includes the arrival time of all satellites in the group; which are represented with the symbols: $T_1$, $T_2$, $T_3$, ..., and $T_N$, wherein N is the total number of satellites in a satellite group, and is an integral number equal to or more than one.

In yet another embodiment, the group ephemeris data includes a group reference time and the intervals of arrival time of all satellites in the group compared to the group reference time. A group reference time, e.g., T, and the intervals of arrival time of all satellites in the group compared to the group reference time, which are calculated as follows:

the interval of arrival time of the $1^{st}$ satellite: $\Delta T_1=T_1-T$
the interval of arrival time of the $2^{nd}$ satellite: $\Delta T_2=T_2-T$
the interval of arrival time of the N satellite: $\Delta T_N=T_N-T$ Therefore, the group ephemeris data includes: T, $\Delta T_1$, $\Delta T_2$, ..., and $\Delta T_N$. Alternatively, the reference time could be the arrival time of one satellite in the group, for example, the reference time is the arrival time of the $1^{st}$ satellite, that is: $T=T_1$.

In step 202, the UE receives the one or more satellite group IDs, and the UE compares the one or more satellite group IDs with one or more satellite group IDs previously stored in the UE. In a typical condition, the UE receives one satellite group ID, and the UE compares the value of the satellite group ID with the value(s) of the satellite group ID(s) previously stored in the UE.

The purpose for the comparison is to determine whether the UE has already stored the ephemeris data corresponding to the newly received one or more satellite group IDs. If the UE already stored the ephemeris data, the UE may skip receiving or decoding the group ephemeris data corresponding to the satellite group ID. If not, the UE needs to receive and decode the group ephemeris data corresponding to the satellite group ID.

The UE compares the value of one newly received satellite group ID with the values of the stored one or more satellite group IDs as follows, if one of the stored satellite group ID has the same value as the value of one newly received satellite group ID, and the two satellite group IDs belong to the same network, the UE determines that the newly received satellite group ID and the corresponding ephemeris data is already stored in the UE, the UE may stop receiving or decoding the corresponding ephemeris data. The same network may be the same Public Land Mobile Network (PLMN), that is, comparing whether the two satellite group IDs have the same PLMN ID.

In one embodiment, if the UE only registers with one satellite network, then the UE does not need to compare whether the two satellite groups belong to the same satellite network. In other words, when the UE only registers with one satellite network, if the value of the newly received satellite group ID is identical to the value of one satellite group ID previously stored in the UE, the UE determines that the UE already has the group ephemeris data corresponding to the newly received satellite group ID, and the UE does not receive or decode the group ephemeris data corresponding to the newly received satellite group ID.

In step 203-1, the UE finds a stored satellite group ID which has the same value as the received satellite group ID, and the two IDs belong to the same network, therefore it could skip receiving or decoding the group ephemeris data corresponding to the satellite group ID from the BS. Afterwards, the UE could continue to use the previously derived results of the ephemeris data of the neighbouring satellites.

Alternatively, none of the stored satellite group IDs has the same value as the value of the received satellite group ID, or if one or more stored satellite group IDs has the same value as the value of the received satellite group ID, but the network of the received satellite group ID is different from those of the one or more stored satellite group IDs. Under this condition, in step 203-2, the UE receives and decodes the group ephemeris data corresponding to the satellite group ID from the BS. The UE then stores the satellite group ID and the corresponding group ephemeris data, and uses this newly stored group ephemeris data for further operations. The UE could derive the arrival time of the neighbouring satellites based on the newly stored group ephemeris data and corresponding satellite group ID(s).

In one embodiment, the arrival times of the neighbouring satellites are derived by the UE based on the satellite level parameters of all satellites and/or the difference values of the satellite level parameters of other neighbouring satellites in the group ephemeris data.

More specifically, if the mean anomaly at reference time of the $x^{th}$ satellite, $M_{0\_x}$, and the ephemeris reference time of the $x^{th}$ satellite, $t_{0e\_x}$, are provided, the arrival time of satellite x, $T_x$, in the satellite group is approximated to:

$$T_x=T_1-t_{0e\_x}$$

wherein $T_1$ is the arrival time of the $1^{st}$ satellite in the same satellite group.

Alternatively, if the difference value of the mean anomaly at reference time of the $y^{th}$ satellite in the group compared to that of the $x^{th}$ satellite, $\Delta M_{0\_y\_x}$, and the ephemeris reference time of the $y^{th}$ satellite, $t_{0e\_y}$ are provided, the arrival time of satellite x, $T_x$, in the satellite group is approximated to:

$$T_x = \frac{\Delta M_{0\_y\_x}}{2\pi}T_{cycle} - t_{0e\_y}$$

wherein $T_{cycle}$ is the cycle period of the satellite orbit and could be calculated based on orbit plane parameters.

In another embodiment, the arrival times of the neighbouring satellites are derived by the UE based on the arrival time or the intervals of arrival time of satellites in the group ephemeris data.

More specifically, if the group reference time T and the intervals of the arrival time of the $x^{th}$ satellite in the group compared to the group reference time $\Delta T_x$ are provided, the arrival time of satellite x in the group is directly provided as $T_x$ is approximated to:

$$T_x = T + \Delta T_x$$

Figure 3:
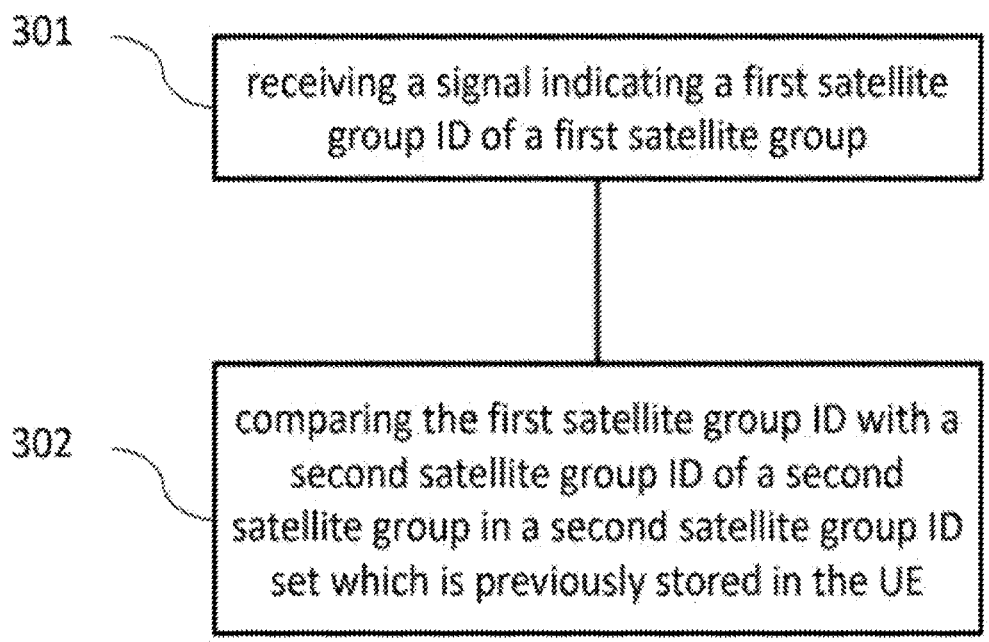
FIG. 3 illustrates a method performed by a UE for wireless communication according to a preferred embodiment of the subject disclosure.

FIG. 3 illustrates a method performed by a UE for wireless communication according to a preferred embodiment of the subject disclosure. In step 301, the UE receives a signal indicating a first satellite group ID of a first satellite group. The signal might be the system information block message, or it might be RRC signalling. In step 302, the UE compares the first satellite group ID with a second satellite group ID of a second satellite group in a second satellite group ID set which is previously stored in the UE. For example, the UE compares the value of the first satellite group ID with the values of the second satellite group when UE only registers to one network. The second satellite group ID set might include only one satellite group ID, or multiple satellite group IDs.

A satellite group ID might one or more satellites grouped by a network, for example, satellites 1, 2 . . . , and N as mentioned above. The satellites in the satellite group might be grouped based on the orbits of the satellites, or the intervals of the arrival times of the satellites. For example, if multiple satellites circle in the same orbit 102 in FIG. 1, they might be grouped in the same group.

The group ephemeris data might include: i) satellite level parameters of all satellites in a group, for example, $M_{0\_1}$, $t_{0e\_1}$, $M_{0\_2}$, $t_{0e\_2}$, . . . , $M_{0\_N}$, and $t_{0e\_N}$; ii) satellite level parameters of one satellite in a group, and the difference values of the satellite level parameters of other neighboring satellites in the same group compared to the one satellite, for example, $M_{0\_1}$, $t_{0e\_1}$, $\Delta M_{0\_1\_2}$, $\Delta t_{0e\_1\_2}$, . . . , $\Delta M_{0\_1\_N}$, and $\Delta t_{0e\_1\_N}$; iii) arrival times of all satellites in a group, for example, $T_1$, $T_2$, $T_3$, . . . , and $T_N$; or iv) a group reference time and intervals of arrival time of all satellites in the same group compared to the group reference time, for example, T, $\Delta T_1$, $\Delta T_2$, . . . , and $\Delta T_N$.

When the first satellite group ID is identical to the second satellite group ID and the first satellite group ID and the second satellite group ID belong to the same network, the UE does not decode the group ephemeris data corresponding to the first satellite group ID. For example, in step 203-1, the UE finds a stored satellite group ID has the same value as the received satellite group ID, and the two IDs belong to the same network, thus it could skip receiving or decoding the group ephemeris data corresponding to the satellite group ID from the BS. The UE then uses the stored group ephemeris data corresponding to the second satellite group ID for further operations. The UE may determine the arrival time of a neighbouring satellite in the second satellite group based on the second satellite group ID and the corresponding group ephemeris data, for example, suppose the $1^{st}$ satellite transmits the signal to the UE, the UE then determines the arrival time of a neighbouring satellite to the $1^{st}$ satellite, for instance, the $2^{nd}$ satellite, in the second satellite group based on the previously stored group ephemeris data of the second satellite group. Or, the UE may determine the arrival time of the $2^{nd}$ satellite based on satellite level parameters of the $1^{st}$ satellite in the second satellite group, and the difference values of the satellite level parameters of the $2^{nd}$ satellite compared to the $1^{st}$ satellite. Alternatively, the UE may determine the arrival time of the $2^{nd}$ satellite based on an arrival time of a reference satellite in the second satellite group and the interval of arrival time between the arrival time of the reference satellite and the arrival time of the $2^{nd}$ satellite.

When the first satellite group ID is different from the second satellite group ID or the first satellite group ID and the second satellite group ID belong to different networks, the UE decodes the group ephemeris data corresponding to the first satellite group ID. That is, the UE found that the BS transmits a new satellite group ID of which the UE does not have the corresponding ephemeris data, the UE needs to receive and decode the group ephemeris data corresponding to the same. The UE then stores the first satellite group ID and the group ephemeris data of the first satellite group ID in the UE. At this time, the group ephemeris data in the UE includes the previously stored group ephemeris data and the newly received group ephemeris data.

Since the UE receives a new satellite group ID, the UE shall employ the group ephemeris data associated with the first satellite group ID for further operations. For example, the UE shall determine the arrival time of a neighbouring satellite, e.g., a $2^{nd}$ satellite, in the first satellite group based on the first satellite group ID and the group ephemeris data. Or, the UE may determine the arrival time of the $2^{nd}$ satellite based on satellite level parameters of the 2st satellite of the first satellite group, and the difference values of the satellite level parameters of the $2^{nd}$ satellite compared to the $1^{st}$ satellite. Alternatively, the UE may determine the arrival time of the $2^{nd}$ satellite based on an arrival time of a reference satellite in the second satellite group and the interval of arrival time between the arrival time of the reference satellite and the arrival time of the $2^{nd}$ satellite.

The satellite group ID may be associated with a timer, which could be configured by the network or the UE. When the timer expires, the UE would delete the corresponding satellite group ID and the group ephemeris data associated with the satellite group ID from the UE. The timer may be reset by the network when it expires, or when the corresponding group ephemeris data updates.

Figure 4:
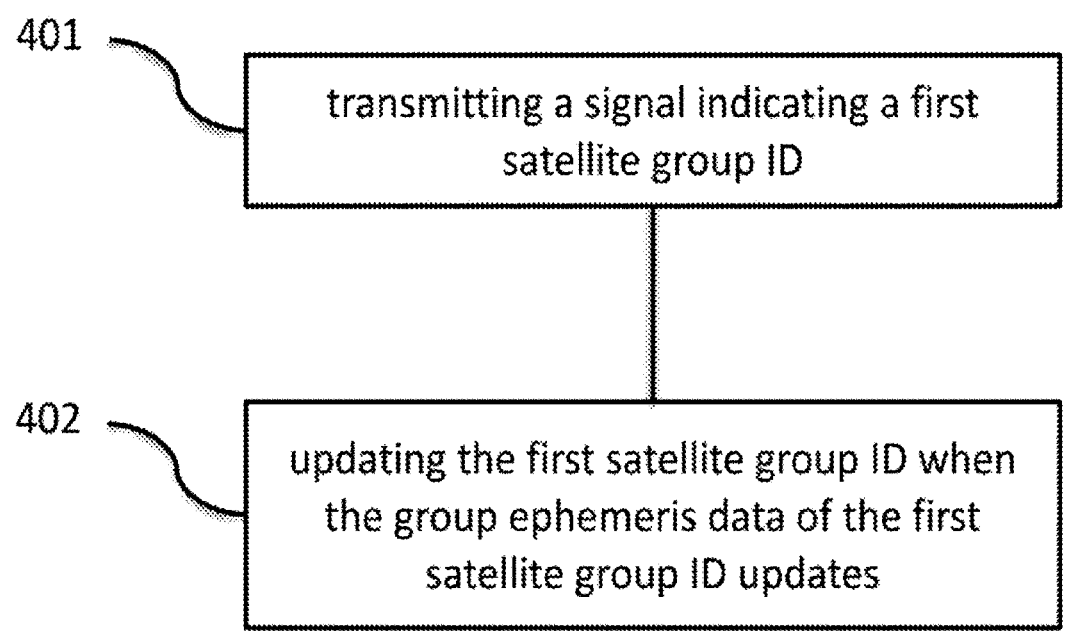
FIG. 4 illustrates a method performed by a BS for wireless communication according to a preferred embodiment of the subject disclosure.

FIG. 4 illustrates a method performed by a BS for wireless communication according to a preferred embodiment of the subject disclosure. In step 401, the BS transmitting a signal indicating a first satellite group ID of a first satellite group, wherein the first satellite group ID is associated with group ephemeris data. The signal might be the system information block message, or it might be RRC signalling. In step 402, the BS may update the first satellite group ID when the group ephemeris data of the first satellite group ID updates. It should be noted that step 402 might not take place if the group ephemeris data of the first satellite group ID does not update. The first satellite group ID indicates a group of satellites grouped by a network, which is grouped based on the orbits of the group of satellites or intervals of the arrival times of the group of satellites. For example, if several satellites circle in the orbit 102 in FIG. 1, they might be grouped in the same group.

The BS may be i) a satellite belonging to a satellite group identified by the satellite group ID; ii) a neighbouring satellite to the satellite group identified by the satellite group ID; iii) a terrestrial BS deployed at an edge of coverage of a terrestrial mobile network; or iv) a neighbouring BS to the satellite group identified by the satellite group ID The satellite group ID may be configured with a timer, and when the timer expires or when the group ephemeris data updates, the timer is reset.

Figure 5:
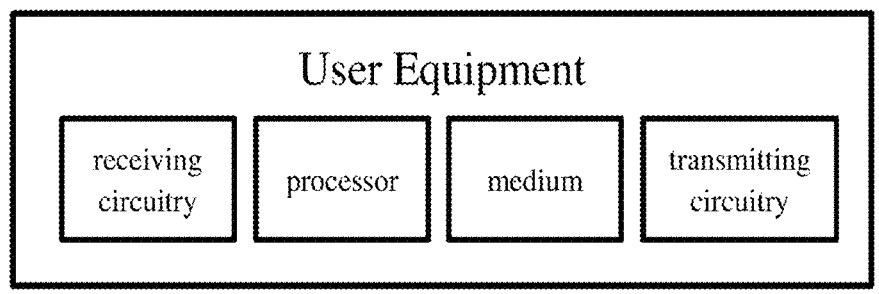
FIG. 5 illustrates a block diagram of a UE according to the embodiments of the subject disclosure.

FIG. 5 illustrates a block diagram of a UE according to the embodiments of the subject disclosure.

The UE may include a receiving circuitry, a processor, and a transmitting circuitry. In one embodiment, the UE may include a non-transitory computer-readable medium having stored thereon computer-executable instructions; a receiving circuitry; a transmitting circuitry; and a processor coupled to the non-transitory computer-readable medium, the receiving circuitry and the transmitting circuitry. The computer executable instructions can be programmed to implement a method (e.g., the method in FIG. 3) with the receiving circuitry, the transmitting circuitry and the processor. That is, upon performing the computer executable instructions, the receiving circuitry receives a signal indicating a first satellite group ID of a first satellite group. The processor then compares the first satellite group ID with a second satellite group ID of a second satellite group in a second satellite group ID set which is previously stored in the UE.

Figure 6:
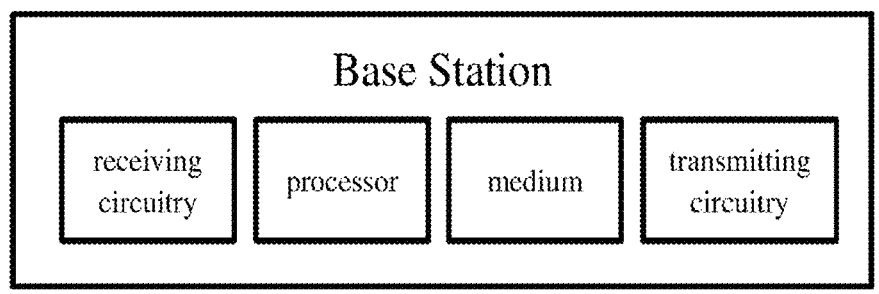
FIG. 6 illustrates a block diagram of a BS according to the embodiments of the subject disclosure.

FIG. 6 illustrates a block diagram of a BS according to the embodiments of the subject disclosure.

The BS may include a receiving circuitry, a processor, and a transmitting circuitry. In one embodiment, the BS may include a non-transitory computer-readable medium having stored thereon computer-executable instructions; a receiving circuitry; a transmitting circuitry; and a processor coupled to the non-transitory computer-readable medium, the receiving circuitry and the transmitting circuitry. The computer executable instructions can be programmed to implement a method (e.g., the method in FIG. 4) with the receiving circuitry, the transmitting circuitry and the processor. That is, upon performing the computer executable instructions, the transmitting circuitry transmits a signal indicating a first satellite group ID of a first satellite group, wherein the first satellite group ID is associated with group ephemeris data. The processor may update the first satellite group ID when the group ephemeris data of the first satellite group ID updates.

The method of the present disclosure can be implemented on a programmed processor. However, controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this disclosure, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A user equipment (UE) for wireless communication, comprising:
   at least one memory; and
   at least one processor coupled with the at least one memory and configured to cause the UE to:
      receive a signal indicating a first satellite group identifier (ID) of a first satellite group;
      compare the first satellite group ID with a second satellite group ID of a second satellite group in a second satellite group ID set which is stored in a user equipment (UE), wherein the first satellite group ID is associated with first group ephemeris data and each satellite group ID of the second satellite group ID is associated with second group ephemeris data; and
      determine an arrival time of a neighboring satellite in the second satellite group based at least in part on satellite level parameters of at least one satellite of the second satellite group, and difference values of satellite level parameters of other neighboring satellites in the second satellite group compared to the at least one satellite of the second satellite group.

2. The UE of claim 1, wherein the second satellite group ID set includes at least one satellite group ID.

3. The UE of claim 2, wherein to receive the signal indicating the first satellite group ID, the at least one processor is configured to cause the UE to perform one or more of to:
   receive a System Information Block (SIB) including the signal indicating the first satellite group ID periodically; or
   receive a Radio Resource Control (RRC) signaling including the signal indicating the first satellite group ID.

4. The UE of claim 2, wherein the first satellite group ID indicates one or more satellites grouped by a network, each satellite group ID of the second satellite group ID set indicates one or more satellites grouped by a network, and the one or more satellites in the first satellite group or the second satellite group are grouped based on orbits of satellites or intervals of arrival times of the satellites.

5. The UE of claim 2, wherein one or more of the first group ephemeris data or the second group ephemeris data includes at least one of:
   satellite level parameters of satellites in a group;
   satellite level parameters of one satellite in a group, and difference values of the satellite level parameters of other neighboring satellites in a same group compared to the one satellite;
   arrival times of satellites in a group; or
   a group reference time and intervals of arrival times of all satellites in a same group compared to the group reference time.

6. The UE of claim 2, wherein the at least one processor is further configured to cause the UE to perform one or more of to:
   not decode the first group ephemeris data corresponding to the first satellite group ID when the first satellite group ID is identical to the second satellite group ID and the first satellite group ID and the second satellite group ID belong to a same network;
employ the second group ephemeris data corresponding to the second satellite group ID;
determine an arrival time of a neighboring satellite in the second satellite group based on the second satellite group ID and the second group ephemeris data; or
determine an arrival time of a neighboring satellite in the second satellite group based on an arrival time of a reference satellite in the second satellite group and an interval of arrival time between the arrival time of the reference satellite and the arrival time of the neighboring satellite, wherein the arrival time of the reference satellite and the interval are included in the second group ephemeris data.

7. The UE of claim 2, wherein the at least one processor is further configured to cause the UE to:
decode the first group ephemeris data corresponding to the first satellite group ID when the first satellite group ID is different from the second satellite group ID or the first satellite group ID and the second satellite group ID belong to different networks;
store the first satellite group ID and the first group ephemeris data of the first satellite group ID in the UE;
form a third satellite group ID set including the first satellite group ID and each satellite group ID of the second satellite group ID set; and
employ the first group ephemeris data associated with the first satellite group ID.

8. The UE of claim 7, wherein the at least one processor is further configured to cause the UE to:
determine an arrival time of a neighboring satellite in the first satellite group based on the first satellite group ID and the first group ephemeris data corresponding to the first satellite group ID.

9. The UE of claim 7, wherein the at least one processor is further configured to cause the UE to:
determine an arrival time of a neighboring satellite in the first satellite group based on satellite level parameters of one satellite of the first satellite group, and difference values of satellite level parameters of other neighboring satellites in the first satellite group compared to the one satellite.

10. The UE of claim 7, wherein the at least one processor is further configured to cause the UE to:
determine an arrival time of a neighboring satellite in the first satellite group based on an arrival time of a reference satellite in the first satellite group and an interval of arrival time between the arrival time of the reference satellite and the arrival time of the neighboring satellite, wherein the arrival time of the reference satellite and the interval are included in the first group ephemeris data.

11. The UE of claim 2, wherein at least one satellite group ID of the first satellite group ID and each satellite group ID of the second satellite group ID set is associated with a timer.

12. The UE of claim 11, wherein the at least one processor is further configured to cause the UE to one or more of cause the timer to be reset by a network when the timer expires, or cause the timer to be reset when corresponding group ephemeris data updates.

13. A method, comprising:
receiving a signal indicating a first satellite group ID of a first satellite group;
comparing the first satellite group ID with a second satellite group ID of a second satellite group in a second satellite group ID set which is stored in a user equipment (UE), wherein the first satellite group ID is associated with first group ephemeris data and each satellite group ID of the second satellite group ID is associated with second group ephemeris data; and
determining an arrival time of a neighboring satellite in the second satellite group based at least in part on satellite level parameters of at least one satellite of the second satellite group, and difference values of satellite level parameters of other neighboring satellites in the second satellite group compared to the at least one satellite of the second satellite group.

14. A processor for wireless communication, comprising:
at least one controller coupled with at least one memory and configured to cause the processor to:
receive a signal indicating a first satellite group identifier (ID) of a first satellite group;
compare the first satellite group ID with a second satellite group ID of a second satellite group in a second satellite group ID set which is stored in a user equipment (UE), wherein the first satellite group ID is associated with first group ephemeris data and each satellite group ID of the second satellite group ID is associated with second group ephemeris data; and
determine an arrival time of a neighboring satellite in the second satellite group based at least in part on satellite level parameters of at least one satellite of the second satellite group, and difference values of satellite level parameters of other neighboring satellites in the second satellite group compared to the at least one satellite of the second satellite group.

15. The processor of claim 14, wherein the second satellite group ID set includes at least one satellite group ID.

16. The processor of claim 15, wherein to receive the signal indicating the first satellite group ID, the at least one controller is further configured to cause the processor to perform one or more of to:
receive a System Information Block (SIB) including the signal indicating the first satellite group ID periodically; or
receive a Radio Resource Control (RRC) signaling including the signal indicating the first satellite group ID.

17. The processor of claim 15, wherein the first satellite group ID indicates one or more satellites grouped by a network, each satellite group ID of the second satellite group ID set indicates one or more satellites grouped by a network, and the one or more satellites in the first satellite group or the second satellite group are grouped based on orbits of satellites or intervals of arrival times of the satellites.

18. The processor of claim 15, wherein one or more of the first group ephemeris data or the second group ephemeris data includes at least one of:
satellite level parameters of satellites in a group;
satellite level parameters of one satellite in a group, and difference values of the satellite level parameters of other neighboring satellites in a same group compared to the one satellite;
arrival times of satellites in a group; or
a group reference time and intervals of arrival times of all satellites in a same group compared to the group reference time.

19. The processor of claim 15, wherein the at least one controller is further configured to cause the processor to perform one or more of to:
not decode the first group ephemeris data corresponding to the first satellite group ID when the first satellite group ID is identical to the second satellite group ID and the first satellite group ID and the second satellite group ID belong to a same network;

employ the second group ephemeris data corresponding to the second satellite group ID;

determine an arrival time of a neighboring satellite in the second satellite group based on the second satellite group ID and the second group ephemeris data; or determine an arrival time of a neighboring satellite in the second satellite group based on an arrival time of a reference satellite in the second satellite group and an interval of arrival time between the arrival time of the reference satellite and the arrival time of the neighboring satellite, wherein the arrival time of the reference satellite and the interval are included in the second group ephemeris data.

20. The processor of claim 15, wherein the at least one controller is further configured to cause the processor to:

decode the first group ephemeris data corresponding to the first satellite group ID when the first satellite group ID is different from the second satellite group ID or the first satellite group ID and the second satellite group ID belong to different networks;

store the first satellite group ID and the first group ephemeris data of the first satellite group ID in the UE;

form a third satellite group ID set including the first satellite group ID and each satellite group ID of the second satellite group ID set; and employ the first group ephemeris data associated with the first satellite group ID.

\* \* \* \* \*